US 6,532,735 B2

(12) United States Patent
Luercho

(10) Patent No.: US 6,532,735 B2
(45) Date of Patent: Mar. 18, 2003

(54) EXHAUST GASES PURIFICATION DEVICE AND METHOD FOR INTERNAL COMBUSTION ENGINES

(75) Inventor: Hector Eduardo Luercho, Buenos Aires (AR)

(73) Assignee: Len Development Services Corp., Tortola (KN)

( * ) Notice: Subject to any disclaimer, the term of this patent is extended or adjusted under 35 U.S.C. 154(b) by 0 days.

(21) Appl. No.: 10/126,401

(22) Filed: Apr. 19, 2002

(65) Prior Publication Data

US 2002/0170288 A1 Nov. 21, 2002

(30) Foreign Application Priority Data

May 16, 2001 (AR) ..................................... P01 01 02331

(51) Int. Cl.[7] .............................................. F02M 25/06
(52) U.S. Cl. .............................. 60/278; 60/289; 60/307; 60/309; 60/311
(58) Field of Search .......................... 60/278, 281, 288, 60/289, 296, 307, 308, 309, 310, 311, 316, 317, 324

(56) References Cited

U.S. PATENT DOCUMENTS

| | | | | | |
|---|---|---|---|---|---|
| 4,987,738 A | * | 1/1991 | Lopez-Crevillen et al. | ... | 60/286 |
| 5,826,423 A | * | 10/1998 | Lockyer et al. | .......... | 60/39.463 |
| 5,826,428 A | * | 10/1998 | Blaschke | ...................... | 60/303 |
| 5,904,042 A | * | 5/1999 | Rohrbaugh | ................... | 60/298 |
| 6,152,978 A | * | 11/2000 | Lundquist | ................... | 55/385.1 |

* cited by examiner

Primary Examiner—Thomas Denion
Assistant Examiner—Binh Tran
(74) Attorney, Agent, or Firm—Harrison & Egbert

(57) ABSTRACT

An exhaust gases purification device for internal combustion engines, of the kind that includes a duct which channels gases from the engine exhaust manifold, and injects them into the device. The device includes a quiet chamber, wherein gases expand, a first standard filter, a buffer plate, then a second filter, and then a centralizer-diffuser assembly where the gas flow is contacted with two external cold air drafts and part of the polluting gases are channeled into a turbulent chamber, from which they are fed into the engine as intake gases. The remaining flow is discharged into an tube ending in a atomizer, and from there into an exhaust tube. The turbulent chamber includes an engine port portion that discharges into fixed buckets, where gases are expanded and channeled into the atomizer that contains a gas recovery outlet back into the engine.

11 Claims, 6 Drawing Sheets

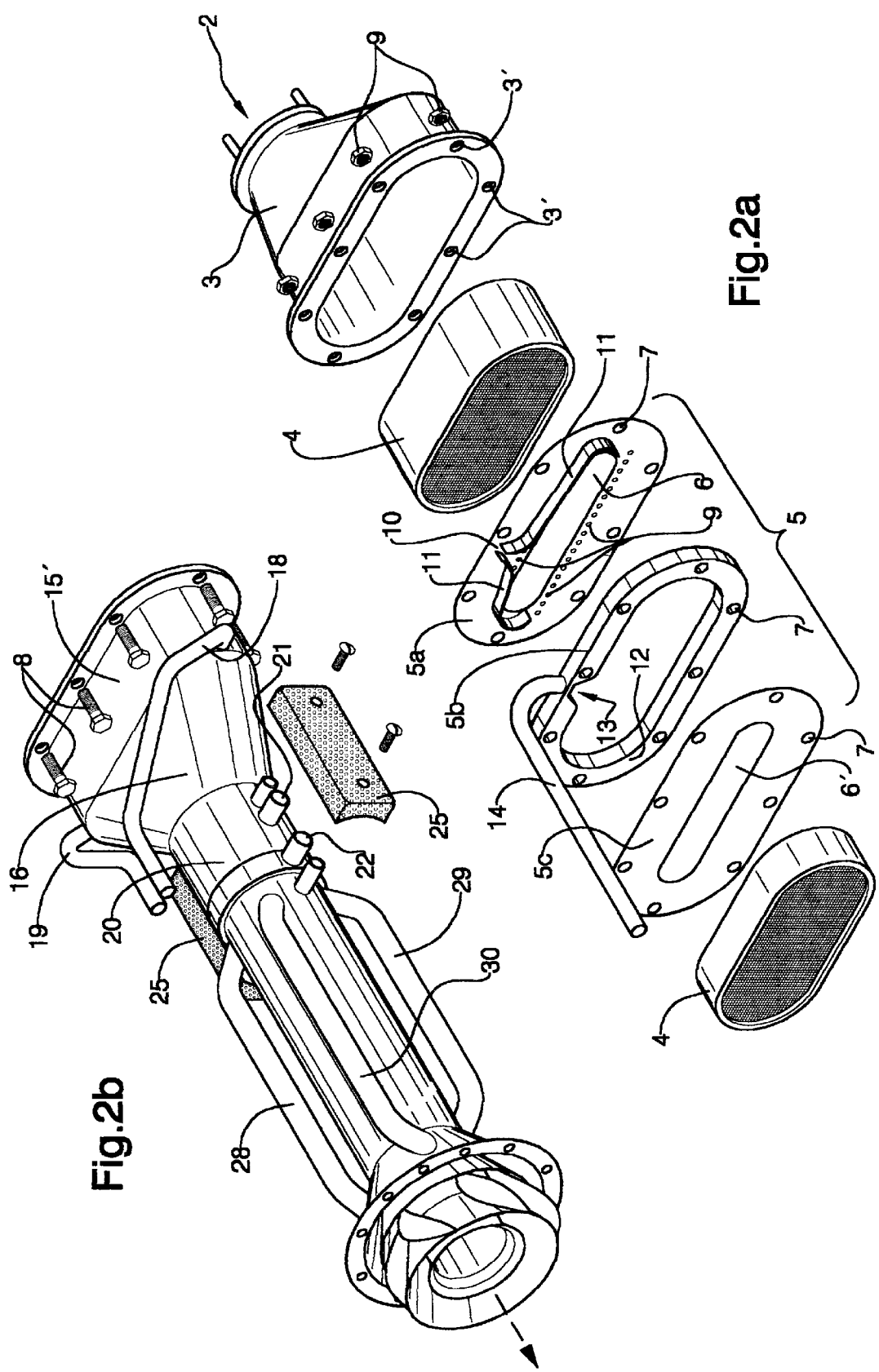

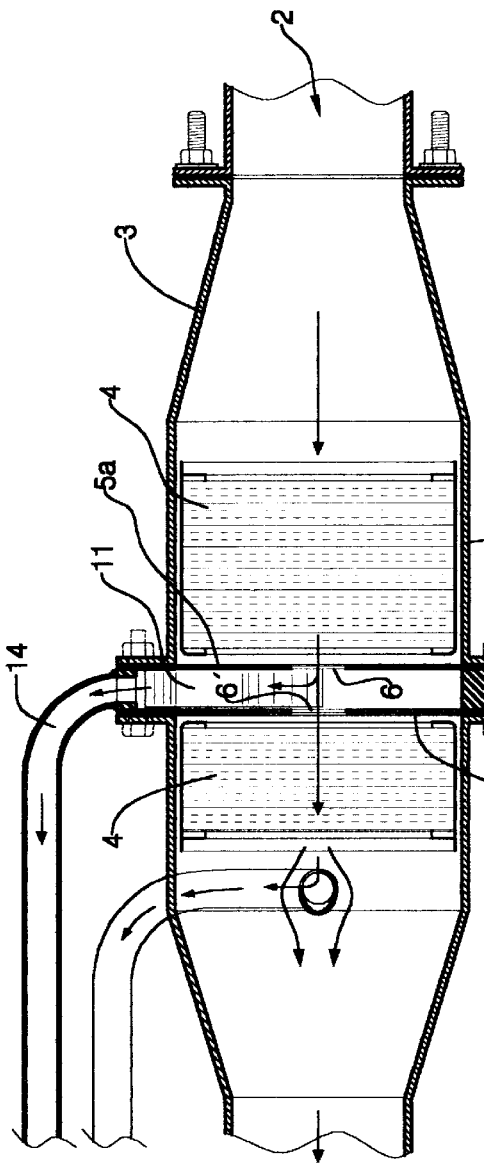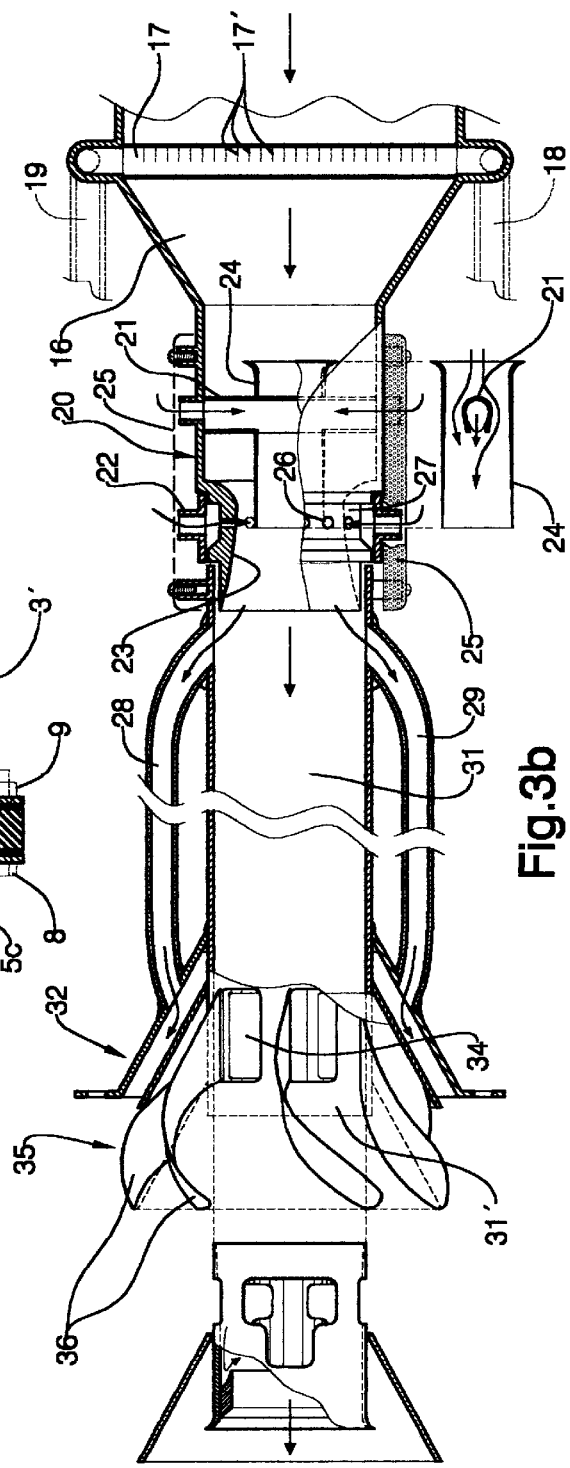

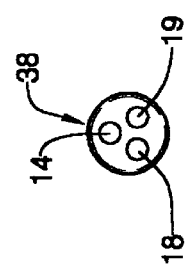
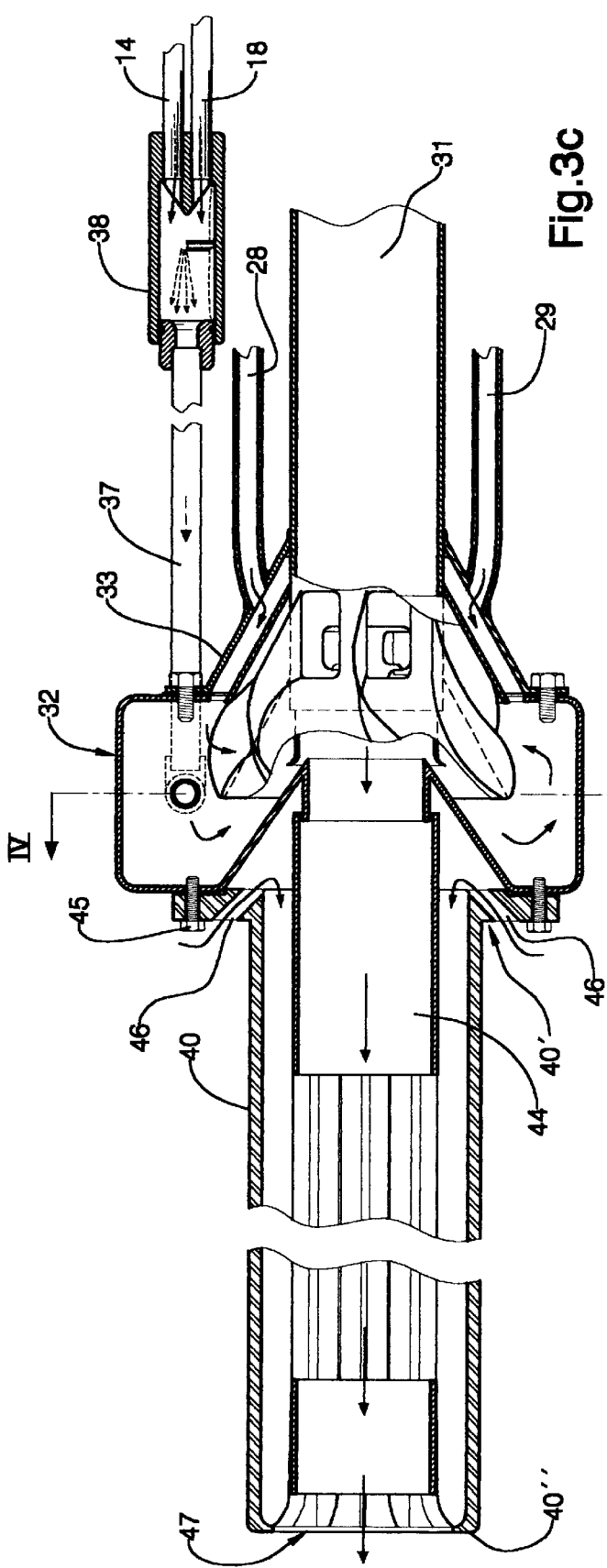
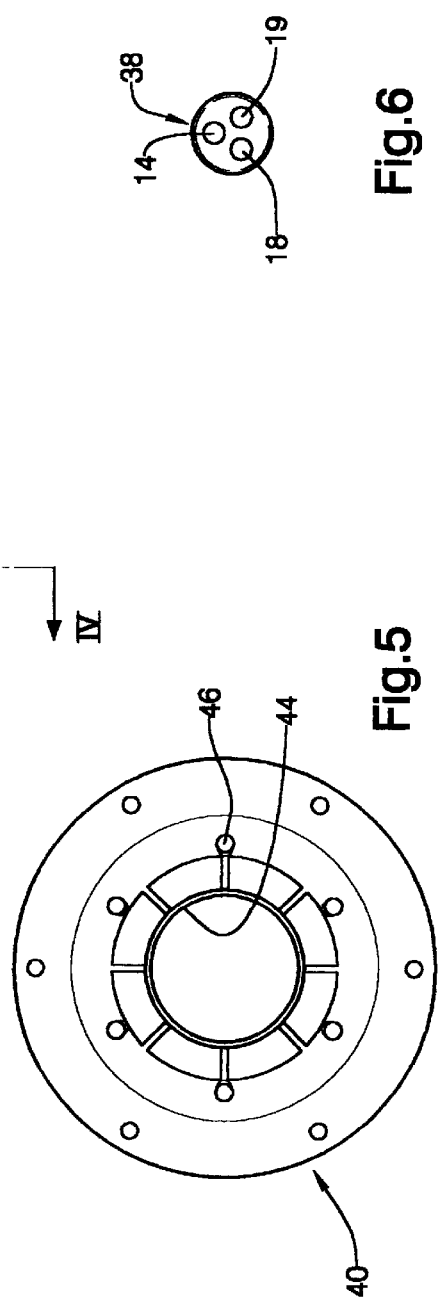

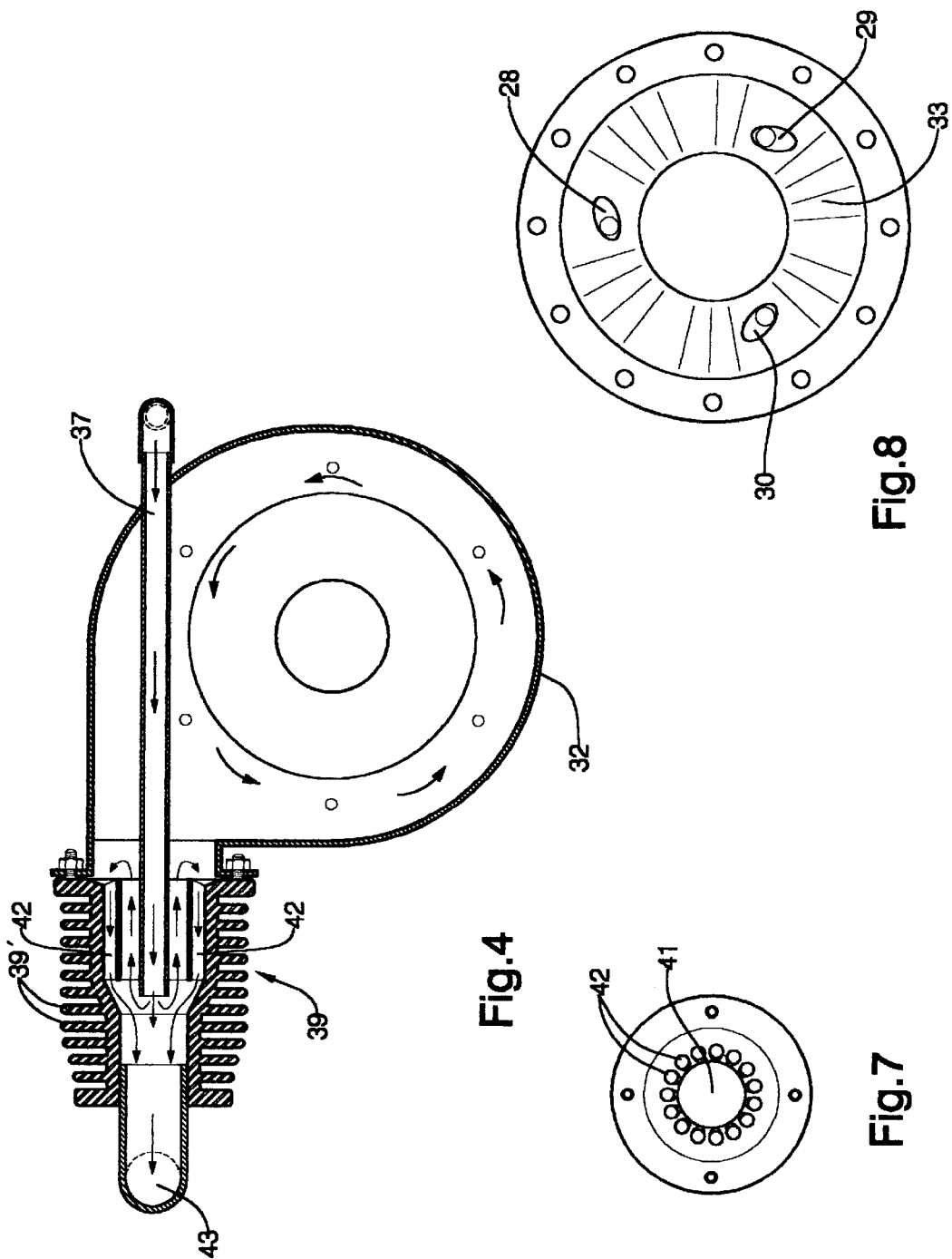

EXHAUST GASES PURIFICATION DEVICE AND METHOD FOR INTERNAL COMBUSTION ENGINES

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to an exhaust gases purification device, which is especially applicable to all kinds of internal combustion engines, whether Diesel or Otto, turbo or not. More particularly, it relates to an exhaust gases purification device for vehicles that can eliminate a significant percentage of the harmful gases coming from the exhaust manifold of an internal combustion engine.

BACKGROUND OF THE INVENTION

Presently, it is practically a standard to fit cars, trucks, vans, and vehicles alike with an exhaust gases purification device due to the growing awareness, not only from car makers, but also from the industry in general, as regards the importance to care for the environment. In Europe, for example, the Association of European Car Makers set as an objective for all the European car industry that carbon dioxide emissions ($CO_2$) of the engines they manufacture shall be within a range of 140 g/km (an average consumption of $5.6^1/_{100}$ km).

It is already well known that internal combustion engines generate an enormous quantity of harmful gases, such as carbon monoxide and dioxide, nitrogen oxides, hydrocarbons, particulate material, black smoke, etc., that pollute the atmosphere once they are released. Thus, there are cities that, due to the amount of vehicles circulating and the features of the geographical areas where they are located, show highly dangerous pollution levels for their inhabitants, as is the case for the city of Mexico Federal District, or Santiago in Chile.

That is why fitting catalysts and other exhaust gases purification devices in cars, in order to diminish pollution levels due to the gases released by engines appears, rather than as an alternative, as a real need.

Most of the exhaust gases purification devices known in the art comprise a purification pre-device that carries out a treatment for carbon monoxide, and a purification device that stores and processes nitrogen oxides. Most of these devices are able to reduce highly polluting gases such as HC, $CO_2$, CO, etc, to large extents.

There have been several exhaust gases purification devices in the previous art. For example, the following United States Patents are only examples of devices intended for this purpose: U.S. Pat. No. 6.342.192; U.S. Pat. No. 6.340.066; U.S. Pat. No. 6.338.244; U.S. Pat. No. 6.338.243; among others.

None of them achieves the objective outlined for the present invention: to purify gases through a laminar treatment device for exhaust gases flows, without putting in means that block the gas outlet. In fact, one of the effects achieved by the present invention, as shown below, is that the engine enhances its power and diminishes fuel consumption. Empirically, it has been shown that said power increase is fundamentally due to the above mentioned laminar treatment of exhaust gases. It is widely known that blocking the outlet of exhaust gases has a direct effect on the engine performance, and traditional catalysts interpose a filter element that brings about a turbulent flow and blocks the gas outlet.

Therefore, the present invention does not interpose any element, such as catalysts, honeycomb structures with precious minerals so as to retain polluting particles, as found in most of the solutions provided by the previous art.

The essential feature of the solution suggested comprises a laminar treatment of the gas flow coming from the engine, and none of the parts of the device suggested directly blocks the outlet path of exhaust gases, but laminates it, separating polluting gases with different physical/chemical features from non-polluting ones, and removing them, so as to purify exhaust gases, as will be later described in detail.

BRIEF SUMMARY OF THE INVENTION

The present invention is directed to an exhaust gases purification device for reducing and/or eliminating polluting gases coming from the exhaust manifold of an internal combustion engine, whether Diesel or Otto.

The exhaust gases purification device suggested reduces the emission of harmful gases, neutralizing smoke. It recovers those unburnt gases (HC, $CO_2$, CO), separates them from the general flow, and sends them as an intake fluid to the engine, thus reducing fuel consumption, and enhancing engine power. The device has been designed in such a way so as to alter the physical features of the flow, by modifying the duct section the gas goes through, modifying its speed at its temperature.

The device does not include movable members, nor electric members and/or electronic ones, or any other member blocking the usual gas flow, therefore no maintenance whatsoever is required.

The present device is applicable for all kinds of vehicles, such as cars, vans, utilitarian vehicles, light and heavy trucks, buses, agriculture machinery, road-building machinery, etc.

According to embodiments carried out at well known engine inspection centers, the amount of HC in exhaust gases is dramatically reduced, in some cases from 10 ppm to 2 ppm, without any kind of fitting or modification in the engine being necessary.

Likewise, the smoke presence is reduced to values as low as 0.04%, or CO, to 0%, or $CO_2$, to 1.3% vol.

Basically, the present invention comprises an exhaust gases purification device that includes a quiet chamber wherein gases go through as they come from the engine, there, they expand and swirl, and then the gases enter a centralizer-emulsifier-diffuser assembly, and then, a laminated gas tube, a turbulent chamber with a gas recovery outlet to the engine, and lastly, the final exhaust tube.

The present invention also includes an exhaust gases treatment method for an internal combustion engine, that basically comprises the following steps of:

channeling exhaust gases coming from the exhaust manifold of an internal combustion engine, and bringing about a quick expansion of the gases within the quiet chamber;

subjecting the flow to a first traditional filtering process;

generating an impact of the flow going out of the filter, bringing about the separation of the particulate material present in the flow, from the water vapor, and the CO diverted for a later treatment;

forcing the remaining flow to pass through an elongated horizontal hole, and a second traditional filter;

the speed of the flow going out of the filter is increased, and the flow is injected two cold air drafts, diverting part of the hot gases located in the outer portion of the flow for a later treatment;

the outer part of the non-diverted remaining flow is diverted together with the rest of the polluting gases already diverted in the steps c) and e) to return to the engine intake manifold; and the remaining non-diverted flow goes out of the device.

BRIEF DESCRIPTION OF THE SEVERAL VIEWS OF THE DRAWINGS

FIG. 2a is also a perspective and exploded partial view of the first part of the device, showing the quiet chamber, the carbon particles purification plates, the filters, and the collection and exhaust means for polluting gases full of particles.

FIG. 2b is another general and perspective view of the middle part of the device, that includes the air inlets for flow cooling, the diverter tubes for polluting gases, and the cone to form the turbulent flow with its corresponding diverter buckets.

FIG. 3a is a section view, according to the section lines IIIa—IIIa in FIG. 1.

FIG. 3b is a section view, according to the section lines IIIb—IIIb in FIG. 1.

FIG. 3c is a section view, according to the section lines IIIc—IIIc in FIG. 1.

FIG. 4 is a section view, according to the section lines IV—IV in FIG. 3c.

FIG. 5 is an end plan view of the exhaust muffler or final exhaust tube, showing the end that gradually couples the turbulent chamber.

FIG. 6 is a cross-sectional view of the diffuser that unifies the diversions of the three tubes channeling polluting gases.

FIG. 7 is an end plan view of the atomizer cylinder fitted before definitely channeling polluting gases to the engine again.

Finally, FIG. 8 is an end plan view of the flared plate closing the turbulent chamber.

DETAILED DESCRIPTION OF THE INVENTION

Fully according to the above descriptions and figures, the present invention relates to an exhaust gases purification device that, as shown in the general reference 1, includes a gas inlet (2), for gases coming from the engine, that has a certain gradient or displacement as regards the longitudinal axis of the present exhaust gases purification device (1), assisting said gradient in the desired diversion of the various gases making up the exhaust gases flow coming from the engine inside the device.

The first processing stage for the present device includes a quiet chamber (3) wherein the gas expansion, decompression, and whirlpool take place.

Figure 1:
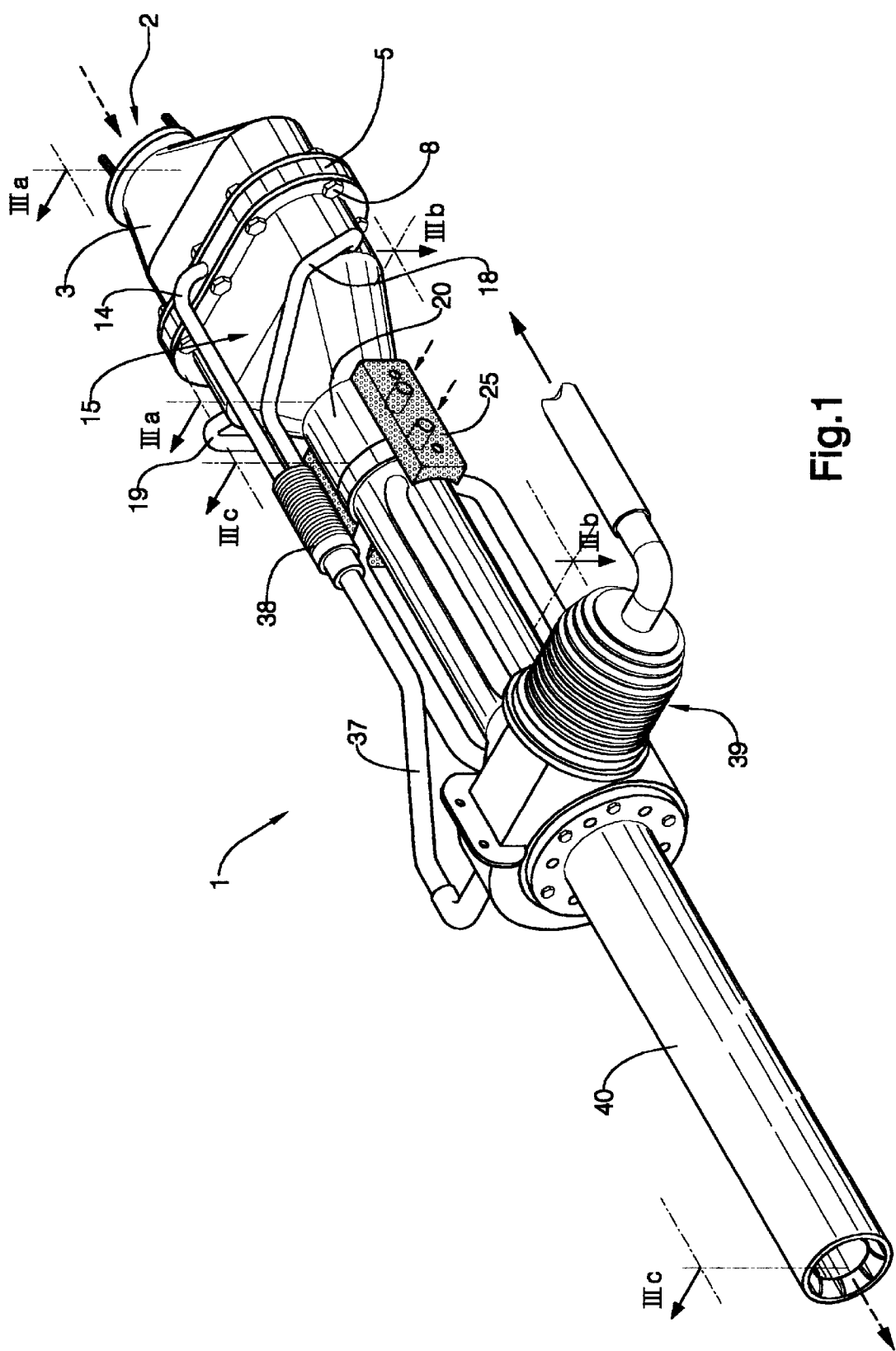
FIG. 1 is a general and perspective view of the exhaust gases purification device according to the present invention.
Figure 2C:
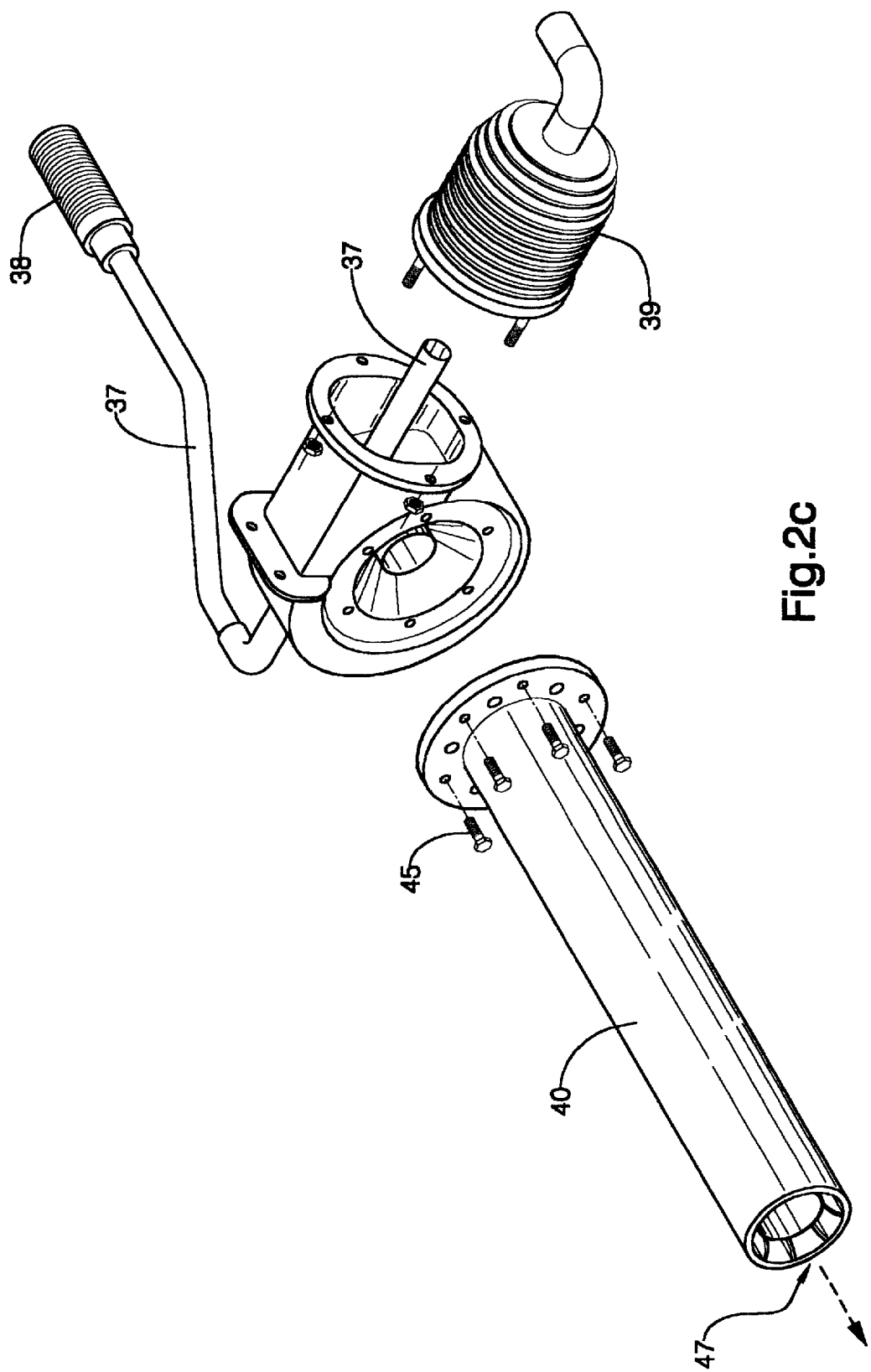
FIG. 2c is another perspective view of the final part of the device that includes the turbulent chamber, the atomizer cylinder, and the exhaust muffler.

The already decompressed gas flow goes out of the quiet chamber (3), and first faces a traditional filter (4), and then a separating plate (5). This plate (5) (see FIG. 2a) comprises a first plate (5a), a channeling gas duct (5b), and a locking plate (5c). The buffer plate (5a) includes a central hole (6) through which the gas flow passes, several holes (7) to fix the plate (5) to the threaded holes (3E) of the chamber (3) through screws (8) with nuts (9), several small holes (9) surrounding the central hole (6), and two guide flanges (11) that go round the upper part of the hole (6), and end up together in a panel point (10). When the gas impacts with the plate (5') several effects take place, and part of the particulate material is kept in holes (9). Between the buffer plate (5a) and the locking plate (5c), and given the presence of flanges (11), and the outer channeling duct (12), there appears a chamber wherein two effects take place: on the one hand, the central gas flow will continue its outgoing path through the hole (6'), similar to the inlet one (6), while a portion of the particulate material, separated from the flow in holes (9), of the water vapor contained in the gas, and of the polluting gases are channeled through the guides (11) towards the inlet hole (13) of a channeling duct (14). The gases coming from the chamber (3) impact with the plate (5a), and a significant portion of the particulate material contained in the gas tends to be channeled through the holes (9). As soon as the gas passes through the holes, the gas flow itself channels them towards the rails (11) from an outer area, that in turn channels it to the outfall (10), and from there, to the hole (13), to the duct (14). According to the embodiments carried out, that will be described in further detail below, during this stage, the gas loses speed, and lowers its temperature, and other polluting gases contained in the gas flow, such as nitrogen oxide, undergo the same process as the particulate material.

At the end of the plate (5), the gas going out through the hole (6') faces another filter unit (4), which is actually located within a chamber (15) that defines a unit called gas tuner. This includes a first portion whose section is identical to the portion (3'), and discharges in a narrow path that defines a funnel (16), that in turn finishes in a central tube (17) of the circular section. These permanent section changes bring about dynamic changes in the gas flow in order to produce a laminar separation among the different gases thereof. Although this simple process does not allow to completely separate the various gases in different sheets, it generates sheets "rich" in certain gases, and after treating each of them separately, it is possible to diminish (never to fully eliminate) some of the polluting gases coming from the engine.

Once the gases go out of the filter unit (4) located in the chamber (15), they face a diffuser tube (17) that includes several notches (17') through which a portion of the gases is channeled, and then makes the gases be channeled through the two diverting ducts (18–19). Once the flow goes through the tapered portion (16) where the flow gets speed, it discharges in the cylindrical centralizer (20) that includes two air inlets, the first of which is a cross-sectional duct (21) for allowing fresh air in, and corresponds to a Venturi like narrowing section (23) that presents a second fresh air inlet duct (22). The first duct (21) is a metallic tube that passes through a tube (24) coaxially located in the centralizer (20), and the fresh air is injected in the middle of the flow in the same sense it advances (see detail in FIG. 3b). Meanwhile, the second air inlet (22) created by the communication of fluid with the air inlet (22), and the outer holes (26) of the ring (27) forming a Venturi like piece according to reference (27). The external ends of the said ducts (21–22) through which fresh air enters are covered by protecting meshes (25) that prevent foreign particles from filtering together with air.

Fresh air coming into the center of the flow makes hot gases (more polluted) stay around the outer area, whereas the center holds gases richer in oxygen. As soon as the flow goes out of the centralizer (20), it faces diverting ducts (28–29–30) that channel hotter gases (polluted) for a later treatment. Meanwhile, the rest of the flow continues its path through a cylindrical duct (31) that discharges in a turbulent chamber (32). The central duct (31) includes an end (31'), engine ports (34) corresponding to a fitted fixed "turbine" (35) that includes several buckets (36). Thus, the gases previously channeled by the duct (31) are diverted partly through the said engine ports towards the turbulent chamber (32), whereas the rest continues towards the outlet muffler (40).

The aforementioned turbulent chamber (32) includes a first cone (33) wherein three other tubes (28–30) mentioned before with hot polluting gases discharges. That is to say, that all polluting gases previously separated discharge in the turbulent chamber (32). Likewise, a duct (37) coming from a diffuser (38), wherein all diverting ducts (14, 18, and 19) before mentioned discharge, passes through the said turbulent chamber to discharge in a atomizer cylinder (39), as well as the gases of the above mentioned turbulent chamber (see FIG. 4). Thus, all different gas flows separated from the central gas flow coming from the engine get to the said atomizer, a portion of which gets through the duct (37), and the rest through the turbulent chamber. This atomizer cylinder (39) includes external fins (39') to dissipate heat, and a central path (41) (see FIG. 7) around which there are several passing holes (42) through which the gas coming from the duct (37) re-circulates, as shown in the gas flow lines in FIG. 4. Once the gas flow leaves the atomizer cylinder (39), it goes out of the device through a duct (43) towards the engine again, in order to join the intake air flow thereof. In fact, recirculating exhaust gases towards the engine as intake air in order to reduce polluting gases emissions is a widely used resource in the industry. This resource has the logical restriction of not affecting the engine operation, and field trials carried out with the present device have shown (see Trials section) that the engine is not only unaffected, but also achieves a greater power, and less consumption.

The present device finishes in a muffler (40) made up of an elongated hollow cylindrical hole that corresponds to the end (40') of an internal coaxial tube (44) that joins the continuity of the central duct (31), and is linked to a turbulent chamber (32) through screws (45). Precisely next to the said screws (45), the muffler includes holes (46) for letting fresh air in its interior, then, the final air flow goes out through the outlet (47).

From the description above appears that the path of the gas flow coming from the engine is as follows.

From the engine, it goes through the exhaust manifold to the inlet (2) where it enters the quiet chamber (3), wherein it expands. The current passes through the filter (4), and impacts the plate (5) where part of the flow goes through the outlet (6'), and part is diverted through the duct (14) towards the diffuser (38).

After the plate (5), it enters the chamber (15), wherein part is diverted through ducts (18–19) towards the diffuser (38), and the rest goes to the centralizer (20).

There it enters into contact with external cold air coming form inlets (21 and 22) that produce a laminar flow that in the center is rich in oxygen, and at the sides, rich in CO, and other polluting gases. A part of them is channeled to the atomizer (39) through the tube (37). When the flow enters the tube (31), the rest of the polluting gases on the tube wall are channeled to the atomizer (39) through the tubes (28–30) that discharge, first, in the turbulent chamber (32) where there are buckets (36) for generating turbulence, and then are channeled to the atomizer (39). The rest of the flow circulating through the tube (31), and not channeled through tubes (28–30), are then channeled to the muffler (40), and from there, out.

Field Trials

In order to analyze the behavior of the present device on a real engine, the Engineering Department of Universidad Tecnologica Nacional of the Argentine Republic was in charge of carrying out several trials. Conclusions reached are presented below:

Less nitrogen oxides emissions;

Less hydrocarbons emissions;

Less particulate material emissions.

In a trial carried out on a test bench engine, the amount of nitrogen oxide significantly diminished (25%), whereas its concentration in a vehicle diminished up to a 46%. Likewise, the amount of particulate material diminished in a 63%, and the concentration of hydrocarbon emissions, 70%.

Finally the present method basically comprises the following stages of:

channeling exhaust gases coming from the exhaust manifold of an internal combustion engine, and produce their quick expansion in a quiet chamber;

subjecting the flow to a first traditional filtering process;

generating an impact of the flow going out of the with a metallic plate including a central hole so as to bring about the separation of part of the particulate material present in the flow, from the water vapor, and the CO diverted to be treated later;

forcing the remaining flow to pass through the plate horizontally elongated hole, and through a second traditional filter;

the speed of the flow going out of the filter is increased, and two cold air drafts are injected, diverting part of the hot gases located in the outer portion of the flow to be treated later;

the remaining outer portion of the non-diverted flow is jointly diverted with the rest of the polluting gases already diverted during stages c) and e) for returning to the engine intake manifold; and the remaining non-diverted flow goes out of the device.

I claim:

1. An exhaust gases purification device for internal combustion engines, comprising a duct channeling gases from an engine exhaust manifold, and injecting said gases into the purification device, said purification device comprising: a quiet chamber, wherein gases expand; a first standard filter, a buffer plate, a second filter, and a centralizer-diffuser assembly where a gas flow contacts two external cold air drafts and polluting gases are channeled into a turbulent chamber, from which said gas flow is fed into an engine as intake gases, remaining flow being discharged into a tube ending in a atomizer, and from said atomizer into an exhaust tube; said turbulent chamber comprising an engine port portion that discharges into fixed buckets, where gases are expanded and channeled into the atomizer that comprises a gas recovery outlet back into the engine.

2. An exhaust gases purification device for internal combustion engines, as claimed in claim 1, characterized in that said buffer plate comprises an elongated hole, and is horizontally placed for channeling a central flow and several outer holes to central holes.

3. An exhaust gases purification device for internal combustion engines, as claimed in claim 1, further comprising, after the buffer plate and the second filter, a second buffer plate identical to the previous buffer plate.

4. An exhaust gases purification device for internal combustion engines, as claimed in claim 1, wherein said centralizer-diffuser assembly comprises a cylinder that in turn comprises a cross-sectional tube communicated to the exterior that injects a first cold air flow, and a ring for outer holes that injects a second cold air flow.

5. An exhaust gases purification device for internal combustion engines, as claimed in claim 1, further comprising, after the centralizer-diffuser assembly, a tube that comprises three outgoing tubes that divert the flow outer gases towards the turbulent chamber.

6. A method of using an exhaust gases purification device for internal combustion engines, as claimed in claim 1, characterized by the following steps of:
   channeling exhaust gases coming from the exhaust manifold of an internal combustion engine, and producing a quick expansion of said exhaust gases in the quiet chamber;
   subjecting a gas flow of said exhaust gases to a first traditional filtering process;
   generating an impact of the gas flow going out of the filter that comprises a metallic surface with an elongated central hole, and several outer holes that produce separation of the a part of particulate material contained in the gas flow, from water vapor, and CO that is diverted to be treated later;
   forcing remaining gas flow to pass through a plate horizontally elongated hole, and through a second traditional filter;
   increasing speed of the gas flow going out of the filter, and injecting two cold air drafts, diverting part of hot gases located in an outer portion of the gas flow to be treated later;
   jointly diverting a remaining outer portion of non-diverted gas flow with remaining polluting gases already diverted during steps of generating and increasing for returning to the engine intake manifold; and
   releasing the remaining non-diverted flow out of the device.

7. An exhaust gases purification method for internal combustion engines, as claimed in claim 6, wherein said step of channeling further comprises decompressing gases and creating a swirl within the quiet chamber.

8. An exhaust gases purification method for internal combustion engines, as claimed in claim 6, wherein said step of generating comprises said gases losing speed and temperature.

9. An exhaust gases purification method for internal combustion engines, as claimed in claim 6, said increasing further comprises injecting first exterior cold air flow to a flow center, in the going direction, and then incorporating a second cold air flow to the gas flow in a perimeter way.

10. An exhaust gases purification method for internal combustion engines, as claimed in claim 6, wherein said step of jointly diverting comprises separating polluting gases from the gas flow in previous steps, and channeling to a atomizer cylinder before being sent to the engine as intake gases.

11. An exhaust gases purification method for internal combustion engines, as claimed in claim 6, wherein said step of jointly diverting comprises discharging gases in a muffler where said gases are injected a cold air flow to lower temperature of the gases before final expulsion.

\* \* \* \* \*